United States Patent
Cox et al.

(10) Patent No.: US 9,619,299 B2
(45) Date of Patent: Apr. 11, 2017

(54) SYSTEM AND METHOD FOR SYNCHRONIZATION USING DEVICE PAIRINGS WITH DOCKING STATIONS

(71) Applicants: Claude Lano Cox, Austin, TX (US);
Liam B. Quinn, Austin, TX (US);
Mark W. Welker, Austin, TX (US);
Rocco Ancona, Austin, TX (US)

(72) Inventors: Claude Lano Cox, Austin, TX (US);
Liam B. Quinn, Austin, TX (US);
Mark W. Welker, Austin, TX (US);
Rocco Ancona, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 69 days.

(21) Appl. No.: 14/308,519

(22) Filed: Jun. 18, 2014

(65) Prior Publication Data

US 2015/0370612 A1   Dec. 24, 2015

(51) Int. Cl.
| | | |
|---|---|---|
| G06F 3/00 | (2006.01) | |
| G06F 9/44 | (2006.01) | |
| G06F 9/46 | (2006.01) | |
| G06F 13/00 | (2006.01) | |
| G06F 9/52 | (2006.01) | |
| G06F 13/40 | (2006.01) | |

(52) U.S. Cl.
CPC ............ *G06F 9/52* (2013.01); *G06F 13/4081* (2013.01)

(58) Field of Classification Search
CPC ........................................................ G06F 9/52
USPC .......................................................... 719/318
See application file for complete search history.

(56) References Cited

U.S. PATENT DOCUMENTS

| | | | |
|---|---|---|---|
| 6,742,037 B1 * | 5/2004 | Hall | H04W 92/18 |
| | | | 701/300 |
| 7,062,515 B1 | 6/2006 | Thomas | |
| 7,761,414 B2 | 7/2010 | Freedman | |
| 8,682,851 B2 | 3/2014 | Weber | |
| 8,782,236 B1 | 7/2014 | Marshall | |
| 2007/0083575 A1 | 4/2007 | Leung | |
| 2013/1091339 | 7/2013 | Haden | |
| 2013/0204849 A1 | 8/2013 | Chacko | |
| 2013/0297844 A1 | 11/2013 | Rosenberg | |
| 2014/0143791 A1 * | 5/2014 | Mark | G06F 9/485 |
| | | | 719/318 |
| 2014/0181198 A1 | 6/2014 | Motes | |
| 2015/0088940 A1 | 3/2015 | Stokely | |
| 2015/0373101 A1 | 12/2015 | Cox | |
| 2015/0373109 A1 | 12/2015 | Cox | |

\* cited by examiner

*Primary Examiner* — Timothy A Mudrick
(74) *Attorney, Agent, or Firm* — Baker Botts L.L.P.

(57) ABSTRACT

A system and method for synchronizing information from an information handling system is disclosed. The method includes identifying a device within a pre-determined range of a docking station, the device operable to communicate with the docking station. The method also includes pairing with the device, determining a user of the device, and predicting, based upon past activity by the user at another docking station, content to be launched on the device. The method further include presenting the content for launching on the device, receiving a selection of the content; and launching the content on the device.

18 Claims, 4 Drawing Sheets

SYSTEM AND METHOD FOR SYNCHRONIZATION USING DEVICE PAIRINGS WITH DOCKING STATIONS

TECHNICAL FIELD

This disclosure relates generally to information handling systems and, more particularly, to a system and method for synchronizing using device pairings with docking stations in information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more information handling systems, data storage systems, and networking systems.

SUMMARY

In accordance with embodiments of the present disclosure, a method for synchronizing content from an information handling system is disclosed. The method includes identifying a device within a pre-determined range of a docking station, the device operable to communicate with the docking station. The method also includes pairing with the device, determining a user of the device, and predicting, based upon past activity by the user at another docking station, content to be launched on the device. The method further includes presenting the content for launching on the device, receiving a selection of the content; and launching the content on the device.

In accordance with embodiments of the present disclosure, an information handling system is disclosed. The information handling system includes a processor, a memory communicatively coupled to the processor, a docking station, a synchronization module, and a predict module. The synchronization module includes instructions in the memory. The instructions are executable by the processor. The instructions, when executed, configure the synchronization module to identify a device within a pre-determined range of a docking station, the device operable to communicate with the docking station. The instructions also, when executed, configure the synchronization module to pair with the device, and determine a user of the device. The predict module includes instructions in the memory. The instructions are executable by the processor. The instructions, when executed, configure the predict module to predict, based upon past activity by the user at another docking station, content to be launched on the device, to present the content for launching on the device, to receive a selection of the content, and to launch the content on the device.

In accordance with embodiments of the present disclosure, a non-transitory machine-readable medium is disclosed. The non-transitory machine-readable medium contains instructions stored therein, the instructions executable by one or more processors, the instructions, when read and executed for causing the processor to identify a device within a pre-determined range of a docking station, the device operable to communicate with the docking station. The instructions, when read and executed for causing the processor to pair with the first device, to determine a user of the device, and to predict, based upon past activity by the user at another docking station, content to be launched on the device. The instructions, when read and executed for causing the processor to present the content for launching on the device, to receive a selection of the content; and to launch the content on the device.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

In the following description, details are set forth by way of example to facilitate discussion of the disclosed subject matter. It should be apparent to a person of ordinary skill in the field, however, that the disclosed embodiments are exemplary and not exhaustive of all possible embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, entertainment, or other purposes. For example, an information handling system may be a personal computer (e.g., desktop or laptop), tablet computer, mobile device (e.g., personal digital assistant (PDA) or smart phone), server (e.g., blade server or rack server), a consumer electronic device, a network storage device, or another suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more storage devices, one or more communications ports (e.g., network ports) for communicating with external devices as well as various input and output (I/O) devices, such as a keyboard, a mouse, a touchscreen and/or a video display. The information handling system may also include one or more buses operable to transmit communication between the various hardware components.

Herein, a computer-readable non-transitory storage medium or media may include one or more semiconductor-based or other integrated circuits (ICs) (such as, for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Particular embodiments are best understood by reference to the following figures, wherein like numbers are used to indicate like and corresponding parts.

Figure 1:
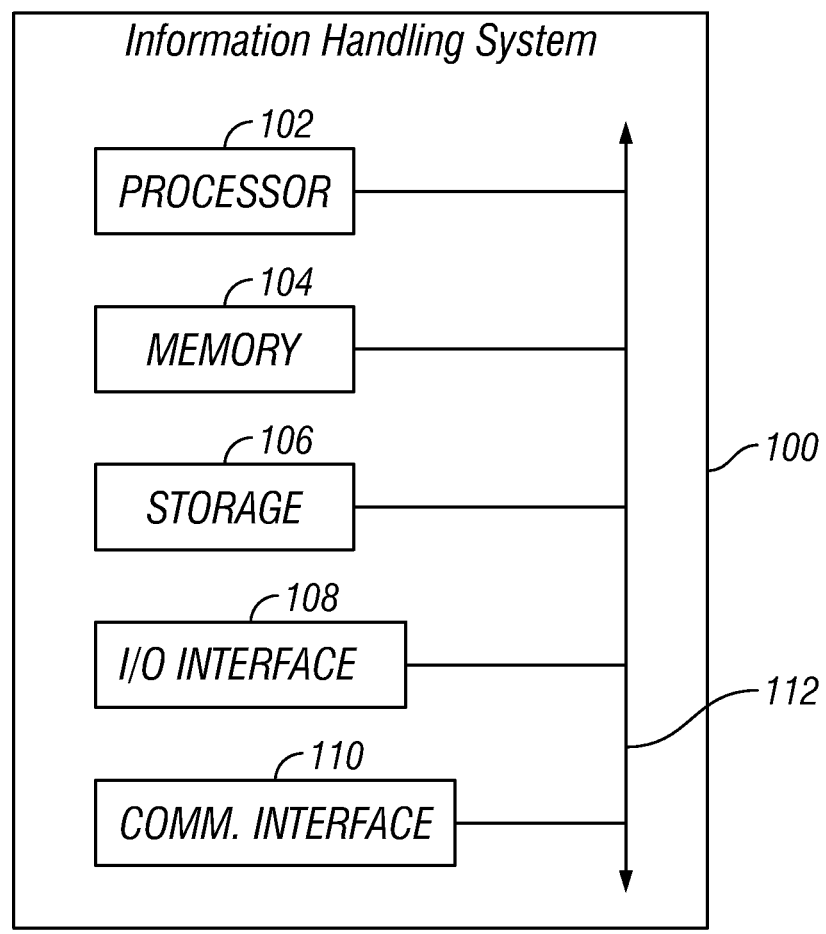
FIG. 1 illustrates a block diagram of selected elements of an embodiment of an information handling system, in accordance with some embodiments of the present disclosure.

FIG. 1 is a block diagram of selected elements of an embodiment of information handling system 100, in accordance with some embodiments of the present disclosure. In particular embodiments, one or more information handling systems 100 perform one or more steps of one or more methods described or illustrated herein. In particular embodiments, one or more information handling systems 100 provide the functionality described or illustrated herein. In particular embodiments, software running on one or more information handling systems 100 performs one or more steps of one or more methods described or illustrated herein or provides functionality described or illustrated herein. Particular embodiments include one or more portions of one or more information handling systems 100. Herein, reference to an information handling system may encompass a computing device, and vice versa, where appropriate. Moreover, reference to an information handling system may encompass one or more information handling systems, where appropriate.

This disclosure contemplates any suitable number of information handling systems 100. This disclosure contemplates information handling system 100 taking any suitable physical form. As an example and not by way of limitation, information handling system 100 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, or a combination of two or more of these. Where appropriate, information handling system 100 may include one or more information handling systems 100, be unitary or distributed, span multiple locations, span multiple machines, span multiple data centers, or reside in a cloud, which may include one or more cloud components in one or more networks. Where appropriate, one or more information handling systems 100 may perform without substantial spatial or temporal limitation one or more steps of one or more methods described or illustrated herein. As an example and not by way of limitation, one or more information handling systems 100 may perform in real time or in batch mode one or more steps of one or more methods described or illustrated herein. One or more information handling systems 100 may perform at different times or at different locations one or more steps of one or more methods described or illustrated herein, where appropriate.

In particular embodiments, information handling system 100 includes processor 102, memory 104, storage 106, input/output (I/O) interface 108, communication interface 110, and bus 112. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up a computer program. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation look aside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 100 may load instructions from storage 106 or another source (such as, for example, another information handling system 100) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate access to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a Universal Serial Bus (USB) drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 100 and one or more I/O devices. Information handling system 100 may include one or more of these I/O devices, where appropriate. One or more of these I/O devices may enable communication between a person and information handling system 100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 108 for them. Where appropriate, I/O interface 108 may include one or more device or software drivers enabling processor 102 to drive one or more of these I/O devices. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both providing one or more interfaces for communication (such as, for example, packet-based communication) between information handling system 100 and one or more other information handling systems 100 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 100 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 100 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or I/O interconnect.

In particular embodiments, information handling system 100 may be a wireless-enabled, portable device that may include one or more processors 102 (e.g., dual core ARM processors), volatile memory 104 (e.g., RAM), non-volatile memory 104 (e.g., flash memory), input/output interfaces 108 (e.g., for display, for data, and for audio), networking/communications interfaces 110, and one or more operating systems (e.g., stored in memory 104 and operated on by processors 102). The input/output interfaces 108 may include display interfaces that support one or more of the Mobile High-Definition Link (MHL) standard, the High Definition Multimedia Interface (HDMI) standard, or the Display Port (DP) standard. The input/output interfaces 108 may also include one or more USB ports (e.g., standard, mini or micro USB), one or more removable memory slots (e.g., SD card slots), and audio capabilities through the MHL, HDMI, or DP interfaces. Information handling system 100 may include networking or communication interfaces 110 that support IEEE 802.11 WLAN protocols (including a, b, g, n, or ac), single or dual band WiFi, BLUETOOTH communication, and near field communication (NFC). Information handling system 100 may include one or more operating systems, including versions of Android, Windows, Wyse ThinOS, Linux, or Apple iOS. Information handling system 100 may include one or more native applications, including, for example, a browser, a media player and recorder, voice over IP and video communication software, and software for remote access to cloud services or other remote content or services. Information handling system 100 may connect through a network to a cloud services system, as described in more detail in FIG. 2. A user may, for example, use information handling system 100 to securely communicate and/or access files or contents that are on the cloud services system.

Figure 2:
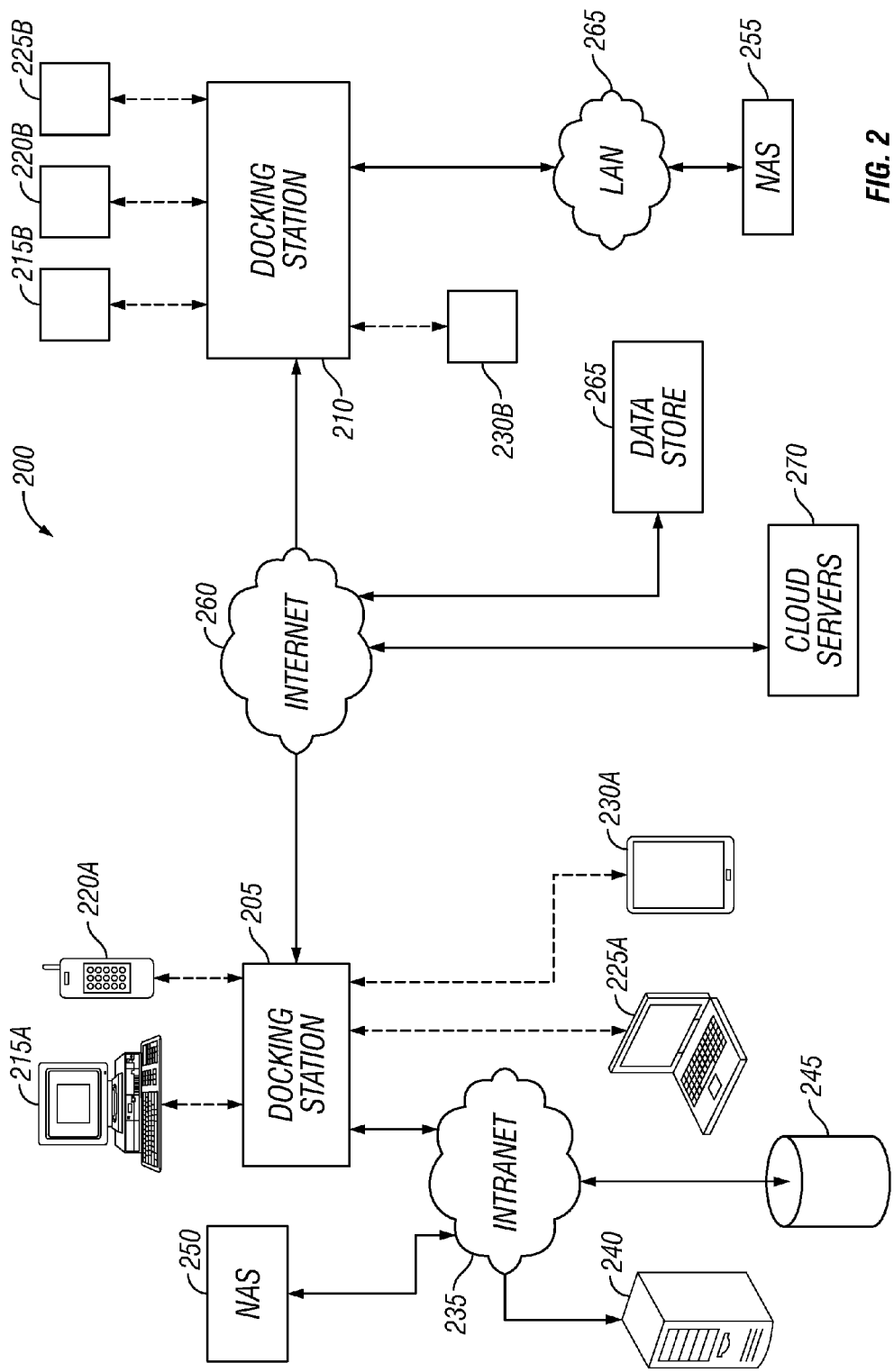
FIG. 2 illustrates an example network environment in which an information handling system may operate with other local or remote devices, in accordance with some embodiments of the present disclosure.

FIG. 2 illustrates an example network environment 200 in which an information handling systems may operate with other local or remote devices, in accordance with embodiments of the present disclosure. In the example of FIG. 2, multiple information handling systems, such as devices 215, 220, 225, 230 may be communicatively coupled to a docking station (dock), such as dock 205 or dock 210. Devices may be communicatively coupled to docking stations in any suitable manner, such as in a wired or wireless fashion. Moreover, each of dock 205 and dock 210 may in turn by information handling systems.

Docks 205, 210 may include any suitable type of router or docking station. Moreover, docks 205, 210 may include the ability to create a network between devices 215, 220, 225, 230. In addition, docks 205, 210 may be included within a network. The network may include, for example, an ad hoc network, a personal area network (PAN), a local area network (LAN), a wide area network (WAN), a metropolitan area network (MAN), or one or more portions of the Internet or a combination of two or more of these network types. One or more portions of the network may be wired or wireless. Such networks may include portions of a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. In the example of FIG. 2, dock 205 may be included as part of a corporate Intranet 235 and dock 210 may be included as part of a LAN 265. Dock 205 and dock 210 may be communicatively coupled through, for example, the Internet 260.

As shown in FIG. 2, dock 205 and dock 210 may allow any docked devices to be coupled to and access any suitable network resource, such as cloud services or other docked devices. For example, such docked devices may access cloud servers 270 or data store 265 that implement cloud computing services. Moreover, dock 205, for example, may allow any docked devices to be coupled to and access server 240, database 245, or network attached storage (NAS) 250 in Intranet 235. In addition, dock 210, for example, may allow any docked devices to be coupled to and access NAS 255 in LAN 265. Although not illustrated in FIG. 2, one or more of the devices of network environment 200 may, in particular embodiments, communicate with each other directly (e.g., wirelessly) or via any other suitable communication method. Additionally, communications may be encrypted by, for example, encryption, proprietary encryption, or a combination of both types.

Network resources, such as server 240, database 245, NAS 250, cloud servers 270, and data store 265 may contain files or content from multiple devices in a single data structure. The files may be linked according to a common user of the devices. The content may be indexed to all navigate to the files. The networked resources may be used to store data at the direction of a user or of a dock. The networked resources may be accessed by one of the devices when docked to one of dock 205 or 210. Dock 205 or 210 may observe, store, or recall instances of connections between given devices and such networked resources. In one embodiment, dock 205 or 210 may, upon docking with a device, determine what connections are likely to be made by the user of the device. In another embodiment, dock 205 or 210 may upon docking with a device, determine application information likely to be used by the user of the device. In such embodiments, dock 205 or dock 210 may make such determinations based upon previous connections of and usage between individual devices and networked resources.

Dock 205 and dock 210 may allow devices to automatically dock. Prior to an automatic dock with a device, the dock may authenticate the device. Authentication may be made by, for example, prompting for a user name and password, via Wired Equivalent Privacy (WEP) security, via Wi-Fi Protected Access (WPA) security, via a smart card, USB token, software token, secure credentials, or any other suitable authentication method.

Each of devices 215, 220, 225, 230 may be associated with a single user or to multiple users. Such association may be made by, for example, a user logged in to the device, the device including an identifier for the user, or any other suitable mechanism. In one embodiment, when a given device associated with a specific user docks with dock 205 or dock 210, such a dock may record the action. In another embodiment, when a given device associated with a specific user is docked and performs operations associated with an application, the associated dock may record the use of the application. In a further embodiment, the associated dock may record information associated with the use of the application. Such information may include, for example, metadata such as search terms, files accessed, other applications that are executed, or specific network resources, such as server 240, database 245, NAS 260, cloud servers 270, data store 265, or NAS 255, that are accessed while docked. Moreover, dock 205 or dock 210 may record any such information associated with the identity of the device, rather than the user. This may be useful, for example, when multiple users are using a given device or the user is not specifically known.

The information stored about the device-user pairing, as well as any associated application or use information, may be stored in any suitable location. In one embodiment, each dock 205, 210 may store the information locally to the dock within its own memory. In another embodiment, each dock 205, 210 may store the information within storage of its own network, such as NAS 250, server 240, database 245, or NAS 250. In yet another embodiment, each dock 205, 210 may store the information in a location that is accessible directly by the other dock. For example, the information may be stored in cloud servers 270 or data store 265.

In one embodiment, the time that a user-device pairing is docked with a given dock, as well as the time that a user-device pairing utilizes given resources or executes given application, may also be recorded. In another embodiment, the combination of such information may allow docks 205, 210 to predict what resources or applications will be executed when a device is newly docked with the dock. For example, given a day of the week or a time of the day, when a laptop such as device 225A docks with dock 205, dock 205 may recognize that typically database 245 will be accessed and that typically a certain application will be executed. In such a situation, dock 205 may present to a user of device 225A the option to open access to database 245 or the given application. In a further embodiment, dock 205 may present the option to such a user to open specific content that is typically used, or may present metadata in the given application that is typically used. Such content may include, for example, a file in database 245 or NAS 250, or searches or preferences in the application.

In yet another embodiment, upon detection of a device, docks 205, 210 may query data or other docks, including each other and docks not illustrated, to determine what resources or applications were previously accessed or executed by the same device or the same user during docking with the other dock. For example, a user of device 230A may have docked device 230A with dock 205 and, during such docking, opened files from NAS 250 and executed a given application from cloud servers 270. Upon later docking the same device 230A with dock 210, dock 210 may query dock 205 to identify the opened files from NAS 250 and the executed application from cloud servers 270. These recently opened files from and the executed application may be presented to the user of device 230A as execution options. In some embodiments, detection of resources or applications may be based upon the identity of the specific device, such as device 230A. Thus, previous use and subsequent presentation to the user may be defined according to the identity of the device. This may be useful, for example, where there is not a specific user defined for the specific device. In other embodiments, detection of resources or applications may be based upon the pairing of the specific device and a specific user. Thus, previous use and subsequent presentation to the user may be defined according to the identity of the device in combination with the user.

In another example, a user of device 230A may have docked device 230A with dock 205 and, during such docking, opened files from NAS 250 and executed a given application from cloud servers 270. The same user may later dock a different device, such as a laptop device 225B with dock 210. Upon later docking with a different device, dock 210 may query dock 205 to identify whether any recently accessed resources, content, or applications were made, such as the opened files from NAS 250 and the executed application from cloud servers 270. These recently opened files from and the executed application may be presented to the user of device 225B as execution options. Thus, dock 210 may utilize the identity of the user to determine what execution options to present.

When determining what options of resources, content, or applications to present to a user, docks 205, 210 may utilize any suitable mechanism or method. In one embodiment, docks 205, 210 may identify resources, content, or applications that have been most recently used. In another embodiment, docks 205, 210 docks 205, 210 may identify resources, content, or applications that have been most popularly used by the user, device, or the user-device combination within a specified time window, such as a day or week. In yet another embodiment, docks 205, 210 may identify resources, content, or applications that are expected to be needed based upon a device docking and a present context. For example, given a day of the week and a time, docks 205, 210 may identify specific resources, content, or applications that are likely to be used by the user, device, or user-device combination. Such identifications may be made by determining patterns in usage. For example, if dock 205 is in an office location of a user and dock 210 is in a home location of the user, dock 210 may determine that docked device 225A is likely to need access to resources of Intranet 235 when docked device 225A is docked with dock 210 in the evenings during workdays. In another example, using the same locations, dock 205 may determine that docked device 220B is likely to need access to resources of LAN 265 when docked device 220B is docked with dock 205 during the day during workdays. Such patterns may be established through analyzing access information stored over time.

Examples of devices are illustrated in FIG. 2, although any suitable device may be used. For example, devices 215 may include desktop computers, device 220 may include smartphones, devices 225 may include laptop computers, and devices 230 may include tablets. The devices may be the same as they are docked respectively to dock 205 and 210, or they may be different but similarly configured devices. For example, although device 225A and device 225B are illustrated as different devices, the same laptop may be represented by each such that the laptop may be transported from dock 205 to dock 210. In another example, device 225A and 225B may represent different laptops that may each be used by a user of system 200 in two different locations. The devices of FIG. 2 may be implemented using any suitable platform or operating system, such as Apple iOS, Microsoft Windows, Android, Wyse ThinOS, or Linux. These platforms and operating system may be heterogeneous or homogeneous.

Accordingly, particular embodiments may allow a user to continue to use a resource, content, or application after switching from one device to another device, such as from device 225A to device 225B, or from taking a device, such as 225A, from dock 205 to dock 210. For example, a user may be reviewing a document on device 225A at work and wish to continue reviewing the document on the same device 225A at home, docked to dock 210. In another example, a user may be reviewing the document on device 215A at work and wish to continue reviewing the document on device 225B at home, docked to dock 210. After switching to the new device or moving the device to dock 210, the user may access the content by selecting an option for the content as presented by dock 210. The user may continue working on the file.

Figure 3:
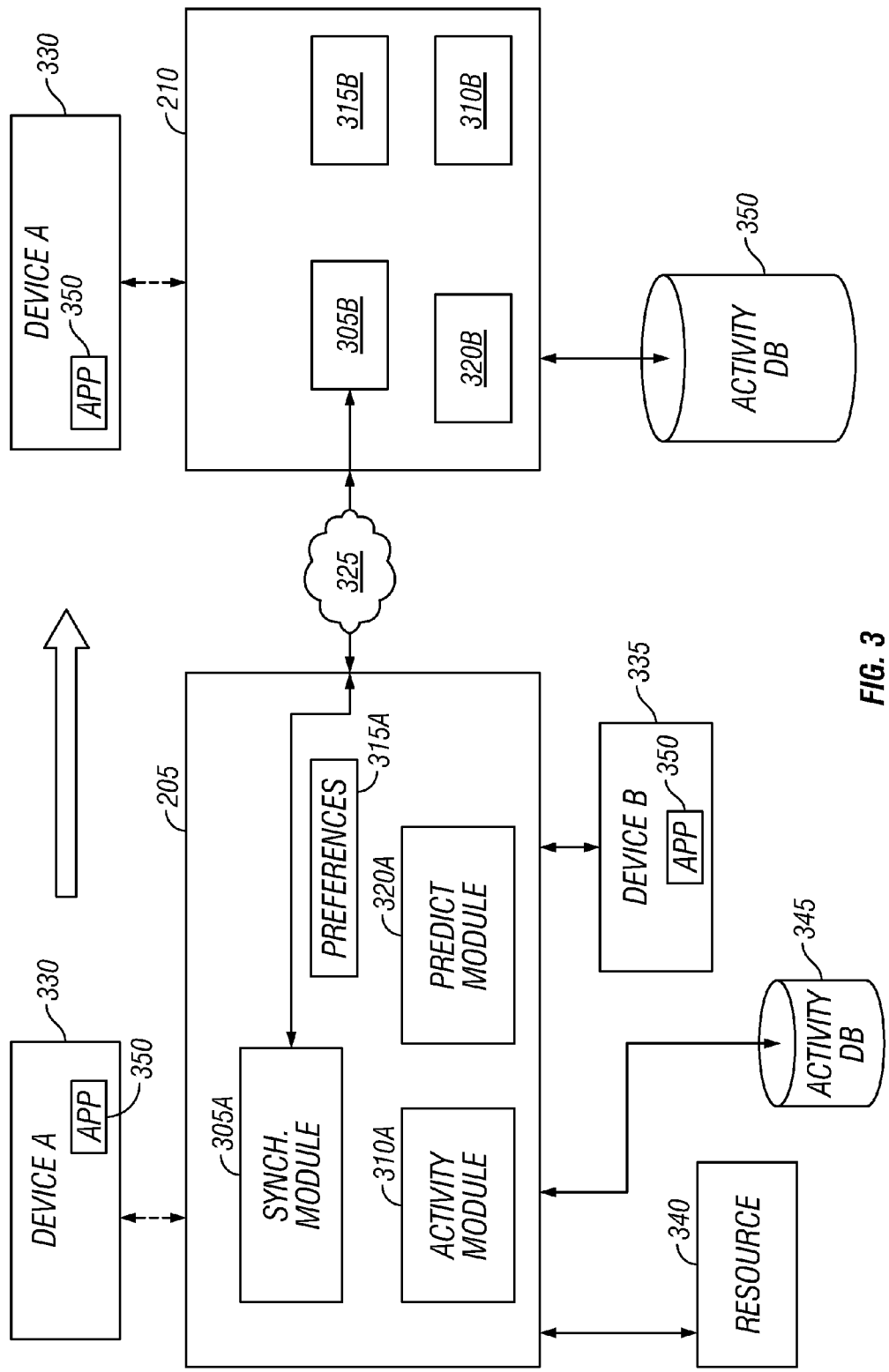
FIG. 3 illustrates a more detailed block diagram of selected elements of an embodiment of a docking station and operation with another docking station and devices, in accordance with some embodiments of the present disclosure.

FIG. 3 illustrates a more detailed block diagram of selected elements and operation of docking stations, in accordance with some embodiments of the present disclosure. Dock 205 and dock 210 are illustrated with similar configurations. In various embodiments, dock 205 and dock 210 may be each implemented in a similar or identical manner. Furthermore, dock 205 or dock 210 may include more or less components as is necessary to perform desired functionality.

In various embodiments, docks 205, 210 may each include a synch module 305, activity module 310, preferences 315, and a predict module 320. Synch module 305, activity module 310, and predict module 320 may each be implemented by any suitable mechanism, such as by code, software, hardware circuitry, functions, libraries, executables, scripts, or applications. Synch module 305, activity module 310, and predict module 320 may include instructions resident within a memory of the dock for execution by a processor of the dock. The instructions, when loaded and executed by the processor, may give effect to the functionality described herein. Preferences 315 may be resident within a memory of the dock.

Synch module 310 may be configured to coordinate operation between docks, such as dock 305 and dock 310, as well as any other docks (not illustrated). Synch module 310 may be configured to, for example, query the other dock to determine past use by a device, user, or device-user combination. Synch module 310 may communicate through any suitable network, such as Internet 325. In one embodiment, synch module 310 may be configured to wake another dock.

Activity module 310 may be configured to store information about activity that is performed by a user, device, or user-device combination. For example, as an application 350 is launched and executed, activity module 310 may record its use, as well as metadata used therein. Such metadata may include, for example, search terms used in searching or a network resource 340 accessed by the application. In another example, activity module 310 may record usage of various content that is accessed by the device. Such activity may be recorded in, for example, an activity database 345 stored locally or on a cloud service.

Predict module 320 may be configured to predict, given a newly docked device, what applications, content, or resources are likely to be needed by a user of the device. Predict module 320 may make such determinations based upon, for example, patterns of usage, a most popular usage, or a most recent usage. Predict module 320 may rely upon information from, for example, activity database 345 to make such determinations. In one embodiment, predict module 320 may poll other docks through synch module 305 to determine recent usage from other docks.

Preferences 315 may specify which prediction by predict module 320 to present to a user. For example, preferences 315 may specify that, for a given device, certain content, resources, or applications should always be presented for launching. In another example, preferences 315 may specify that resuming use of elements from the last docking by the user, wherever it may have been and by whatever device, should be presented as an option. In yet another example, preferences 315 may be based upon a specific one of the dock, device, time of day, day of the week, or any combination thereof.

By presenting content, resources, or application for launching, docks 205, 210 may distinguish such elements from other available elements. For example, while such content, resources, or applications might be available to a user even without using the prediction and presentation, docks 205, 210 may make access to such elements faster, easier, or more convenient. For example, docks 205, 210 may present such elements in a pop-up query to a user. In another example, docks 205, 210 may encapsulate such elements in a profile and present them to a user. A profile may include, for example, a designation of the location of the dock and device, such as "work dock - - - laptop" so that the user will understand the options to be those used previously at a work dock and in conjunction with a specific laptop. A profile may describe the elements to be quickly launched. Faster or more convenient access may be made by, for example, automatically launching the elements, or allowing one-click launching of the elements. Multiple profiles or sets of elements may be presented for selection. Moreover, a user, even after disregarding such presented options, or after selecting a specific option, may later return to the options and select a different option.

In operation, in one embodiment a user may launch application 350 from a device, such as device A 330, after it is docked with dock 205. In another embodiment, a user may launch application 350 from a device, such as device B 335, after it is docked with dock 205. The activities associated with application 350, such as access of resource 340, the identity of the user, and the identity of the device may be recorded by activity module 310A. The activities may be recorded at any suitable time, such as upon undocking of the device, upon a predetermined action such as a save operation, or at a regular interval.

Subsequently, a user may move to dock 210. The user may utilize a same device as was used with dock 205, such as wherein device A 330 was taken with the user from dock 205 to dock 210. Moreover, the user may utilize a different device as was used with dock 205, such as wherein device B 335 was used with dock 205, but the user now uses device A 330 with dock 210.

Upon newly docking device A 330 with dock 210, synch module 305B may determine whether preferences 315B specify predictions are to be made upon patterns of use, recent use by other docks, or a combination thereof. Preferences 315B may have been set by a user of dock 210 or may have been populated by default based upon factory settings or previous selections by a user of dock 210. If necessary, synch module 305B may query or poll other docks, such as dock 205 and other docks not illustrated, to determine the most recent login of device A 330 or the user of device A 330. Furthermore, synch module 305B may wake other docks. For example, synch module 305B may poll dock 205 through its synch module 305A to determine the elements used by device A 330, if user-device combinations are sought, or device B 335, if mere user information is sought. Synch module 305A may reply with such information as stored in, for example, activity database 345. Synch module 305B may provide any such information to predict module 320B.

Moreover, depending upon preferences 315B, predict module 320B may analyze past usage as recorded in its own activity database 350. Predict module 320B may determine most recent use on dock 210, historical patterns of use on dock 210, or other suitable information to determine what options to present to a user of dock 210.

The user of dock 210 may view the options presented for quick access of elements to be used. If the user selects elements that are available elsewhere, such elements may be retrieved and any necessary applications launched. For example, if the user selects to utilize content from NAS 250 on Intranet 235, or an application form cloud servers 270, dock 210 may retrieve or launch such elements through synch module 305B. Moreover, if the user selects one option or profile, or declines the options or profiles, the user may later return to the presented options to select a new or different option or profile.

Upon undocking of device A 330, or upon a predetermined action such as a save operation, or upon a predetermined interval, the actions taken by the user may be recorded in activity database 350. Such actions may be used by an instance of synch module 305 or an instance of predict module 320 on any suitable dock to subsequently make a presentation to the user about what elements to launch. Such a subsequent presentation may be made, for example, after docking device A 330 to another dock, or upon docking of another device to another dock by the same user.

Figure 4:
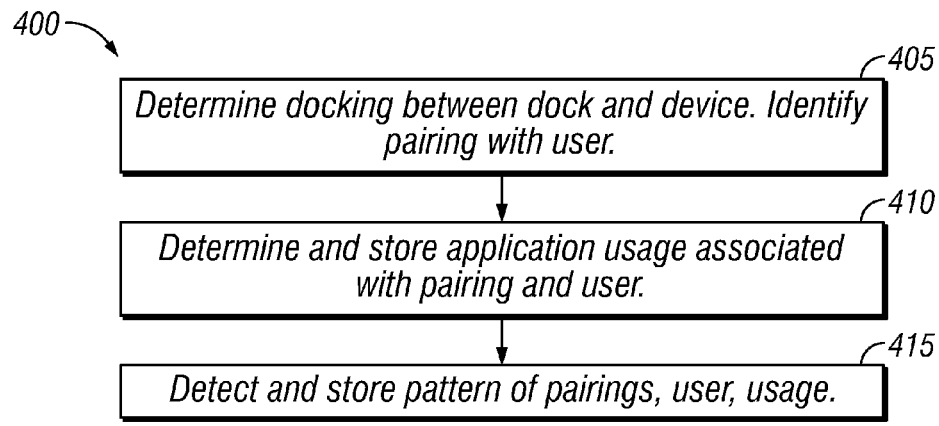
FIG. 4 illustrates an example method for determining device pairings and patterns for predicting usage, in accordance with some embodiments of the present disclosure.

FIG. 4 illustrates an example method 400 for determining device pairings and patterns for predicting usage, in accordance with some embodiments of the present disclosure. The method may begin at 405, wherein docking between a given device and a given dock may be determined. Based on such a docking, a user, if any is identifiable, may be determined and logically paired with the device.

At 410, application usage may be determined and stored. Such usage may include, for example, specific applications, local or network-based, that are executed, content that is read or written, or resources that are accessed. Usage may be stored periodically, upon undocking, or upon a particular action by the user. Such an action may include, for example a save operation.

At 415, a pattern of usage in view of the user or user pairings with docked devices may be determined. Such patterns may include, for example, most-recently accessed elements on a previous docking, a typical usage of elements for the given device and time, or a most popular usage of elements within a defined window of time. The patterns may be based upon a given device, the user for any device, a specific dock, or any combination thereof. The pattern may be stored or otherwise used for presenting execution options to a user.

Figure 5:
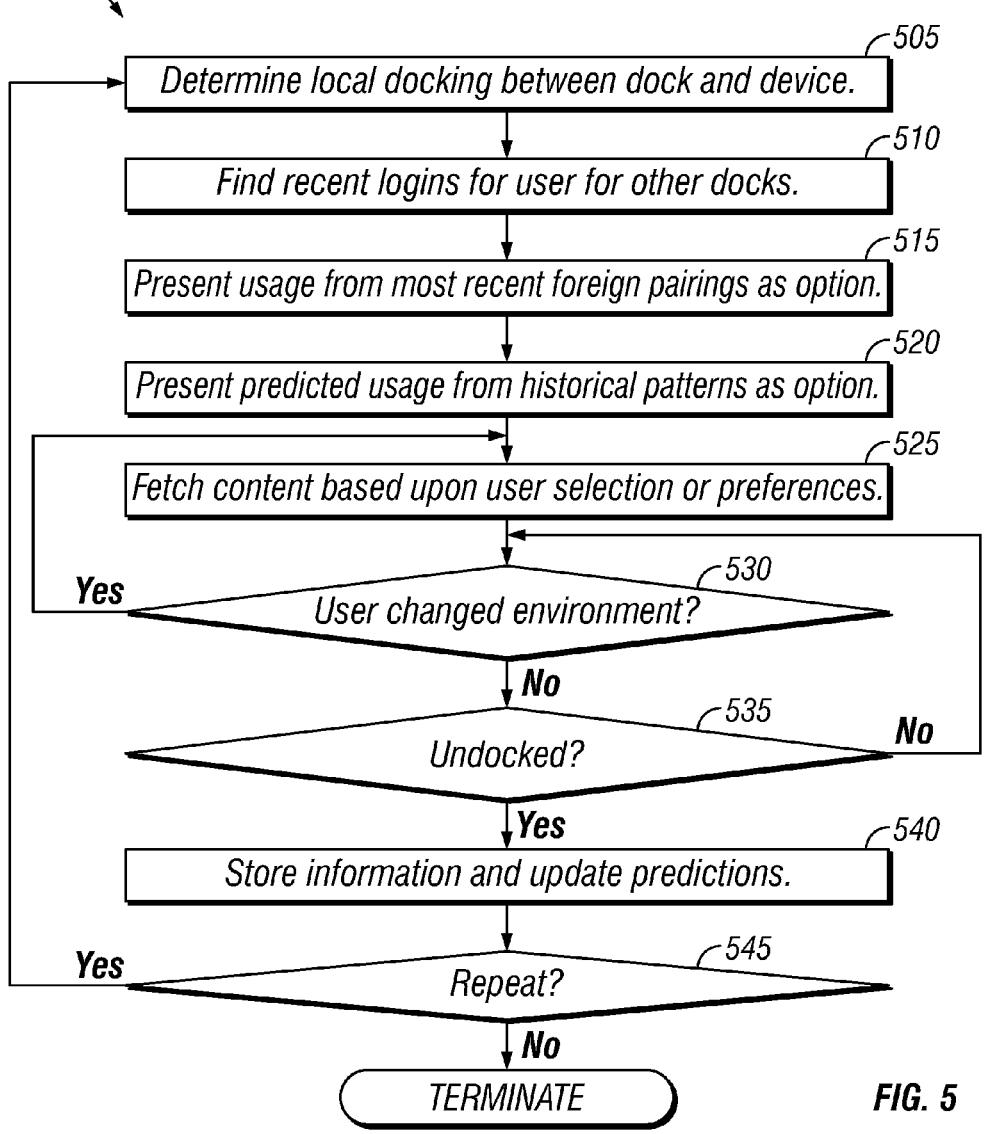
FIG. 5 illustrates an example method for synchronization using device pairings with docking stations, in accordance with some embodiments of the present disclosure.

FIG. 5 illustrates an example method 500 for synchronization using device pairings with docking stations, in accordance with some embodiments of the present disclosure. Method 500 may begin at step 505 where a device may enter the range of a dock. The range of the dock may be based on the capabilities of the dock, the capabilities of the device, the operating environment, or any other factor that may affect the range of a router or docking station. The device may automatically connect with the dock. The automatic connection may include an authentication step. The automatic connection may also require that the device be previously set-up to communicate and connect with the dock. The device may automatically connect with the dock without any action by the user. For example, the device may automatically connect with the dock without the user having to authenticate the connection. The device might not be physically connected to the dock. For example, the device may connect with the dock via Wi-Fi or any other suitable wireless method for connecting devices.

At 510, recent logins for the user may be determined by polling other docks. Such polling may identify any dockings with the device from step 505 or any other suitable device. Such polling may include waking other docks.

At 515, usage of elements such as application execution, access to resources, or access to content that was mostly recently used on other docks may be presented as an option. At 520, usage of elements that have been predicted as likely to be useful may be presented. Such usage may be predicted according to, for example, historical usage patterns identifying days of the week, time of day, identity of the dock, and identity of the device. 515 and 520 may be implemented fully or in part by, for example method 400. Moreover, any suitable additional number or kind of options may be presented to the user in addition to the examples of 515 and 520. At 525, elements included in the options selected by the user may be fetched. The user may operate the device accordingly.

At 530, it may be determined whether the user has attempted to change the execution environment by, for example, selecting a different option that was presented in 515 or 520. If the user has changed environments, then usage may be recorded and method 500 may return to 525. If the user has not changed environments, method 500 may proceed to 535.

At 535, it may be determined whether the device is longer in use with the dock. Such a determination may include further determining, for example, that the device is undocked, that the user has logged off, or that a period of inactivity has occurred. If the device is no longer in use, method 500 may proceed to 540. If the device is still in use, method 500 may return to 530.

At 540, information about usage may be stored. Such information may include an identification of the user, device, time, applications executed, resources accessed, or content accessed. Furthermore, information may be stored at other elements of method 500. Predictions about likely future use may be updated. 540 may be implemented fully or in part by method 400.

At 545, it may be determined whether to repeat method 500. If so, method 500 may return to 505. Otherwise, method 500 may terminate. Moreover, additional instances of method 500 may be launched upon parallel docking of another device to the dock.

Particular embodiments may repeat one or more steps of the methods of FIGS. 4-5, where appropriate. Although this disclosure describes and illustrates particular steps of the methods of FIGS. 4-5 as occurring in a particular order, this disclosure contemplates any suitable steps of the methods of FIGS. 4-5 occurring in any suitable order. Moreover, although this disclosure describes and illustrates example methods including the particular steps of the methods of FIGS. 4-5, this disclosure contemplates any suitable method for performing the functionality described above which may include all, some, or none of the steps of the methods of FIGS. 4-5 where appropriate. Furthermore, although this disclosure describes and illustrates particular components, devices, or systems carrying out particular steps of the methods of FIGS. 4-5, this disclosure contemplates any suitable combination of any suitable components, devices, or systems carrying out any suitable steps of the methods of FIGS. 4-5.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for selecting and using a file from a pointer provided by a dock including the particular steps of the method of FIG. 5, this disclosure contemplates any suitable method for selecting and using a file from a pointer provided by a dock including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for synchronizing content for an information handling system comprising:
    identifying a first device within a pre-determined range of a first docking station, the first device operable to communicate with the first docking station;
    pairing with the first device;
    determining a user of the first device;
    predicting, based upon past activity by the user at a second docking station, content to be launched on the first device, wherein predicting includes polling the second docking station to determine whether the user had previously accessed content through the second docking station;
    presenting, based upon the prediction, the content for launching on the first device;
    receiving a selection of the content; and
    launching the content on the first device.

2. The method of claim 1, wherein predicting content to be launched on the first device includes determining content that was most recently accessed by the user through the second docking station.

3. The method of claim 1, wherein predicting content to be launched on the first device includes determining content that was most recently accessed by a second device of the user docked to the second docking station.

4. The method of claim 1, wherein predicting content to be launched on the first device further includes determining a pattern of usage by the user at the second docking station and by the first device docked to the first docking station.

5. The method of claim 1, wherein:
    presenting the content includes presenting at least two options encapsulating different sets of the content;
    receiving the selection of the content includes receiving a selection of one of the options;
    launching the content includes launching the selected option on the first device; and
    the method further comprises, subsequent to launching the selected option, allowing selection of the other option and launching of the other option.

6. The method of claim 1, further comprising polling the second docking station to determine whether the first device had previously accessed content through the second docking station.

7. An information handling system comprising:
    a processor;
    a memory communicatively coupled to the processor;
    a first docking station; and
    a synchronization module including instructions in the memory, the instructions executable by the processor, the instructions, when executed, configure the synchronization module to:
        identify a first device within a pre-determined range of a first docking station, the first device operable to communicate with the first docking station;
        pair with the first device; and
        determine a user of the first device;
    a predict module including instructions in the memory, the instructions executable by the processor, the instructions, when executed, configure the synchronization module to:
        predict, based upon past activity by the user at another docking station, content to be launched on the first device, wherein predicting includes polling the other docking station to determine whether the user had previously accessed content through the other docking station;
        present, based upon the prediction, the content for launching on the first device;
        receive a selection of the content;
        launch the content on the first device.

8. The information handling system of claim 7, wherein predicting content to be launched on the first device includes determining content that was most recently accessed by the user through the other docking station.

9. The information handling system of claim 7, wherein predicting content to be launched on the first device includes determining content that was most recently accessed by a second device of the user docked to the other docking station.

10. The information handling system of claim 7, wherein predicting content to be launched on the first device further includes determining a pattern of usage by the user at the other docking station and by the first device docked to the first docking station.

11. The information handling system of claim 7, wherein:
    presenting the content includes presenting at least two options encapsulating different sets of the content;
    receiving the selection of the content includes receiving a selection of one of the options;
    launching the content includes launching the selected option on the first device; and
    the predict module is further configured to, subsequent to launching the selected option, allow selection of the other option and launching of the other option.

12. The information handling system of claim 7, wherein the synchronization module is further configured to poll the other docking station to determine whether the first device had previously accessed content through the other docking station.

13. A non-transitory machine-readable medium comprising instructions stored therein, the instructions executable by one or more processors, the instructions, when read and executed for causing the processor to:
    identify a first device within a pre-determined range of a first docking station, the first device operable to communicate with the first docking station;

pair with the first device;
determine a user of the first device;
predict, based upon past activity by the user at a second docking station, content to be launched on the first device, wherein predicting includes polling the second docking station to determine whether the user had previously accessed content through the second docking station;
present, based upon the prediction, the content for launching on the first device;
receive a selection of the content;
launch the content on the first device.

14. The non-transitory machine-readable medium of claim 13, wherein predicting content to be launched on the first device includes determining content that was most recently accessed by the user through the second docking station.

15. The non-transitory machine-readable medium of claim 13, wherein predicting content to be launched on the first device includes determining content that was most recently accessed by a second device of the user docked to the second docking station.

16. The non-transitory machine-readable medium of claim 13, wherein predicting content to be launched on the first device further includes determining a pattern of usage by the user at the second docking station and by the first device docked to the first docking station.

17. The non-transitory machine-readable medium of claim 13, wherein:
presenting the content includes presenting at least two options encapsulating different sets of the content;
receiving the selection of the content includes receiving a selection of one of the options;
launching the content includes launching the selected option on the first device; and
the processor is further caused to, subsequent to launching the selected option, allow selection of the other option and launching of the other option.

18. The non-transitory machine-readable medium of claim 13, wherein the processor is further cause to poll the second docking station to determine whether the first device had previously accessed content through the second docking station.

* * * * *